United States Patent [19]
Shires

[11] Patent Number: 5,725,136
[45] Date of Patent: Mar. 10, 1998

[54] VIDEO CAMERA HOLDER

[76] Inventor: Danny Shires, 8525 Variel Ave., Canoga Park, Calif. 91304

[21] Appl. No.: 627,797
[22] Filed: Mar. 19, 1996
[51] Int. Cl.$^6$ .................................................. G03B 17/56
[52] U.S. Cl. ...................... 224/257; 224/270; 224/908; 396/423
[58] Field of Search ........................ 224/623, 607, 224/257, 270, 271, 907, 908, 930; 352/243; 396/423

[56] References Cited

U.S. PATENT DOCUMENTS

| | | | |
|---|---|---|---|
| 2,586,954 | 2/1952 | Juliano | 224/908 |
| 2,711,122 | 6/1955 | Klumpp | 224/257 X |
| 4,327,986 | 5/1982 | Carter | 396/423 |
| 5,186,375 | 2/1993 | Plonk | 224/623 |
| 5,526,970 | 6/1996 | Yates | 224/270 |

Primary Examiner—Renee S. Luebke
Attorney, Agent, or Firm—Oppenheimer Poms Smith

[57] ABSTRACT

A camera holder is provided which has a support structure which is generally a single arcuate bar. Attached to one end of the support structure is a body rest member, adapted to fit comfortably against the upper torso of the user. Attached to the other end of the support structure is a pair of lateral members extending laterally in opposite directions from the support structure. Attached to the support structure is a strap which is placed behind the neck of the user to support the furthermost end of the support structure. The camera holder of the invention provides a simple, lightweight and stable platform for holding a portable camera, especially a video recorder, without the necessity of the hands of the user.

17 Claims, 1 Drawing Sheet

VIDEO CAMERA HOLDER

FIELD OF THE INVENTION

This invention relates generally to portable camera support devices and, specifically, to chest-mounted portable camera support suitable for retaining portable video cameras.

BACKGROUND OF THE INVENTION

Portable video cameras are becoming increasingly popular. A problem with using a portable video recorder is holding the camera steady. Another problem with using video recorders is fatigue in the user's arms from holding the video camera for long periods of time. Still another problem with using portable cameras is that the person recording a particular event must keep his or her eye pressed to the eye piece of the camera (to keep the camera properly directed to the subject), and can therefore not scan the entire scene for other recordable action occurring during the course of an event.

Several attempts have been made to solve these problems by using some form of portable camera holder attached to the camera person's body. However, all of the previously conceived portable camera holders suffer from one or more of the following problems: (a) unduly expensive; (b) unduly heavy; (c) unduly clumsy; (d) insufficiently stable; and (e) supports the camera at a location which does not allow the camera person to conveniently use the eye piece.

SUMMARY

The invention provides a solution to these problems. The invention is a camera holder comprising (1) a support structure capable of firmly retaining a camera with a camera lens in such a way that the line of sight for the camera lens is substantially horizontal, the support structure having a first end and a second end; (2) a body rest member having a body rest surface, the body rest member being attached to the first end of the support structure such that, when a camera is attached to the support structure, the body rest surface is substantially perpendicular to the line of sight of the camera lens; (3) first and second lateral members extending laterally in opposite directions from the second end of the support structure, each lateral member having a proximal end and a distal end; and (4) a neck strap having opposed neck strap ends, each neck strap end being attached to the distal end of a corresponding lateral member.

The invention allows the user of the camera to safely hold the camera in a generally horizontal orientation without use of the user's hand by running the neck strap around behind the user's neck and resting the body rest surface against the front of the user's torso.

In a typical embodiment, the support structure is a single arcuate bar, the body rest member is a single flat plate attached to one end of the arcuate bar and the first and second lateral members are individual bars attached to the opposite end of the arcuate bar.

DESCRIPTION OF THE DRAWINGS

These and other features, aspects and advantages of the present invention will become better understood with reference to the following description, appended claims and accompanying drawings where:

DETAILED DESCRIPTION OF THE INVENTION

Figure 1:
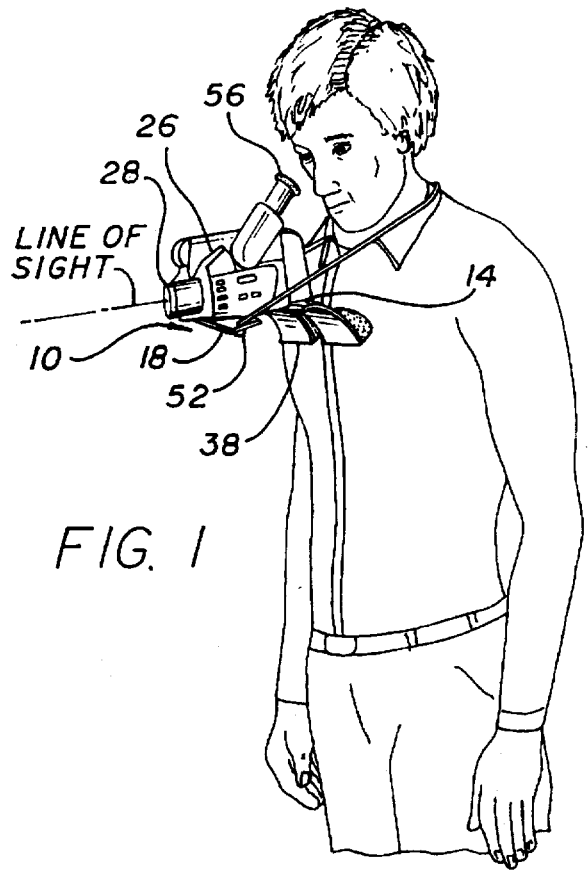
FIG. 1 is a perspective view of a camera holder having features of the invention as it might be used by a user.
Figure 3:
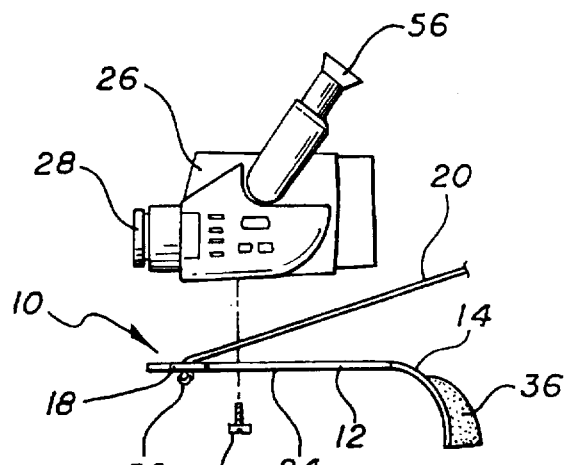
FIG. 3 is a side view of a camera holder having features of the invention.
Figure 4:
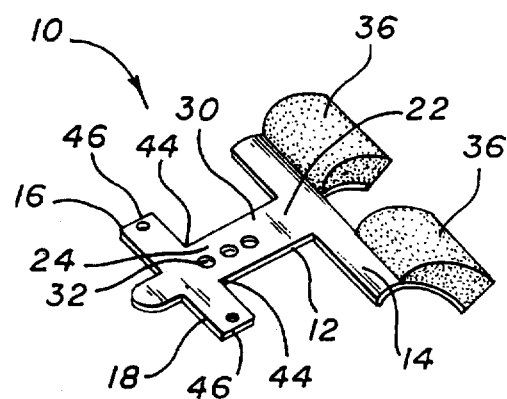
FIG. 4 is a perspective view of a camera holder having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

The invention is a camera holder 10 comprising a support structure 12, a body rest member 14, first and second lateral members 16 and 18 and a neck strap 20.

Figure 5:
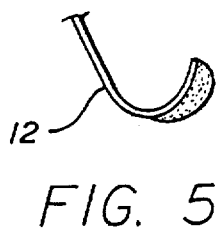
FIG. 5 is a cross-sectional side view of a camera holder having features of the invention.

The support structure 12 has a first end 22 and a second end 24. The support structure 12 is capable of firmly retaining a camera 26 in such a way that the line of sight of the camera lens 28 is directed in a substantially horizontal direction. In a typical embodiment, such as that shown in the drawings, the support structure 12 is a single arcuate bar 30 having a length between about 5 inches and about 10 inches. In the embodiments shown in FIGS. 1-4, the support structure 12 defines a single arc. In the embodiment shown in FIG. 5, the support structure 12 has double arc "S" shaped. The bar 30 is made from a metal, although rigid plastics or other suitable rigid materials can be used.

In the embodiments shown in the drawings, a means of firmly retaining a camera 26 to the support structure 12 is provided by one or more apertures 32 disposed in the second end 24 of the support structure 12. The apertures 32 correspond to attachment bolts 34 or clips generally provided with most commercially-sold portable cameras 26. If such attachment bolts 34 or clips are not part of the user's portable camera 26, a suitable clamp (not shown) or other attachment means can be attached to the second end 24 of the support structure 12 for retaining the portable camera 26.

The body rest member 14 has a body rest surface 36 suitable for resting the camera holder 10 against the front of the user's torso 38. The body rest surface 36 can be shaped to conform to the upper torso 38 of a human being. The body rest surface 36 generally will be slightly arcuate in order to reset against the user's torso 38. The body rest surface 36 will also generally be padded with a suitable padding material 40.

The body rest member 14 is attached to the first end 22 of the support structure 12 such that, when a camera 26 is attached to the support structure 12, the body rest surface 36 rest against the user's torso 38. This orientation allows the camera holder 10 to rest against the front of the user's torso 38 while maintaining the camera 26 in an orientation such that the line of sight of the camera lens 28 is generally directed in a horizontal direction.

In the embodiment illustrated in the drawings, the body rest member 14 is a single flat bar. In a typical embodiment, the body rest member 14 is a single bar having a length between about 5 inches and about 10 inches.

The body rest member 14 can be made from the same material as the support structure 12. In a typical embodiment where the support structure 12 is made from a metal, the body rest member 14 will also be made from the same metal and be welded to the first end of the support structure 12.

The first and second lateral members 16 and 18 are disposed on the second end 24 of the support structure 12 such that they extend laterally in opposite directions from the support structure 12. Each of the lateral members 16 and 18 has a proximal end 44 and a distal end 46, the proximal ends 44 are generally attached to the supporting structure 12 and the distal ends 46 are spaced somewhat apart from the support structure 12.

In the embodiment shown in the drawings, the lateral members 16 and 18 are provided by a single bar attached orthagonally to the second end 24 of the support structure 12.

In a typical embodiment, such as that shown in the drawings, the support structure 12 also has a longitudinal axis 50 and the distance between the longitudinal axis 50 and the distal end 46 of each lateral members 16 and 18 is between about 1 inch and about 5 inches, preferably between about 2 inches and about 4 inches. Longer distances add unnecessary width and weight. Lesser distances tend to diminish the side-to-side stability of the camera holder.

The neck strap 20 has opposed neck strap ends 52. Each neck strap end 52 is attached to the distal end 46 of a corresponding lateral member 16 and 18. The attachment means is not critical. In the embodiment illustrated in the drawings, the attachment means is provided by strap slits 54 disposed in each of the distal ends 52 of the lateral members 16 and 18. In another embodiment, strap rings (not shown) having a circular shape or a "D" shape, can be attached at the distal ends 46 of the lateral members 16 and 18. Such rings can be swivelable or fixed.

The neck strap 20 is typically between about 20 inches and about 40 inches, preferably between about 25 inches and about 35 inches. The neck strap 20 is typically made from a leather, plastic or woven material.

The use of the first and second lateral members 16 and 18 adds an important dimension of stability to the camera holder 10 of the invention. Without the lateral members 16 and 18, the ends 52 of the neck strap 20 would have to be attached directly to the support structure 12. This would cause the camera holder 10 to be unstable in a side-to-side direction. The support structure 12 would tend to pivot from side-to-side at the second end 24 of the support structure 12 where it joins the body rest member 14. By using the lateral members 16 and 18, the supporting forces holding the camera holder 10 against the torso of the user 38 are separated into two generally parallel force vectors which evenly distribute support of the camera 26 along the entire length of the body rest member. This minimizes the tendency of the camera holder 10 to swing from side-to-side.

Figure 2:
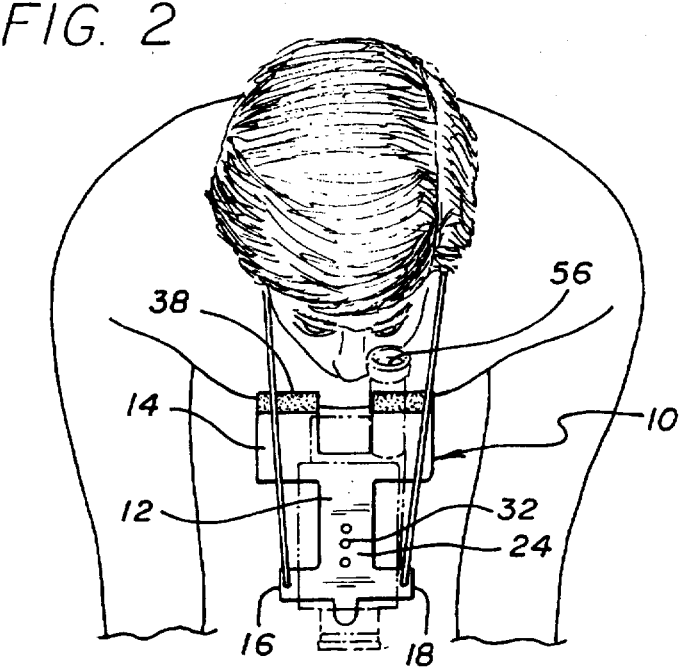
FIG. 2 is a top view of the camera holder of FIG. 1.

FIGS. 1 and 2 show the camera holder 10 of the invention in operation. A camera 26, typically a video recorder, is attached on the upper side of the support structure 12. The body rest surface 14 is placed against the chest of the user 38 and the neck strap 20 is placed around the neck of the user 38. The camera 26 is thereby firmly and stably supported on the camera holder 10 in a position whereby the eye piece 56 of the camera 26 is conveniently disposed with respect to the user's eye.

The camera holder of the invention provides a simple, inexpensive and lightweight way of supporting a portable camera, especially a video recorder, without use of the user's hands. The camera holder of the invention is very stable because of the first and second lateral members. The use of the camera holder allows the user to continue to record a particular scene in a steady and stable fashion without causing fatigue to the user's arm. The camera holder of the invention also allows the user to continue to record a particular scene while turning his or her head from side to side to monitor other potentially recordable scenes at the same location.

Although the present invention has been described in considerable detail with reference to certain preferred versions, many other versions should be apparent to those skilled in the art. Therefore, the spirit and scope of the appended claims should not necessarily be limited to the description of the preferred versions contained herein.

What is claimed is:

1. A camera holder for retaining a camera, wherein the camera has a lens, the lens having a line of sight, the camera holder being retained against the torso of user in such a way that the line of sight of the camera lens is substantially horizontal, the camera holder comprising:

(a) a support structure adapted to firmly retain a camera having a first end and a second end and having a length;

(b) a body rest member having a body rest surface, the body rest member being attached to the first end of the support structure;

(c) first and second lateral members extending laterally in opposite directions from the second end of the support structure, each lateral member having a proximal end and a distal end; and (d) a neck strap having opposed neck strap ends, each neck strap end being attached to the distal end of a corresponding lateral member;

so that, when the camera is retained by the support structure, the user of the camera can safely hold the camera in a generally horizontal orientation without the use of the user's hands by running the neck strap around behind the user's neck and resting the body rest surface against the front of the user's torso.

2. The camera holder of claim 1 wherein the length of the support structure is between about 5 inches and about 10 inches.

3. The camera holder of claim 1 wherein at least one opening is provided in the second end of the support structure.

4. The camera holder of claim 1 wherein the body rest surface of the body rest member is adapted to rest against the upper torso of a human being.

5. The camera holder of claim 1 wherein the body rest surface of the body rest member is padded.

6. The camera holder of claim 1 wherein the support structure has a longitudinal axis and the distance between the longitudinal axis and the distal end of each lateral member is between about 1 inch and about 5 inches.

7. The camera holder of claim 1 wherein the support structure has a longitudinal axis and the distance between the longitudinal axis and the distal end of each lateral member is between about 2 inches and about 4 inches.

8. The camera holder of claim 1 wherein the length of the neck strap is between about 20 inches and about 40 inches.

9. The camera holder of claim 1 wherein the length of the neck strap is between about 25 inches and about 35 inches.

10. The camera holder of claim 1 wherein the support structure is a single bar.

11. The camera holder of claim 10 wherein the body rest member is arcuate.

12. The camera holder of claim 10 wherein the body rest member is S-shaped.

13. A combination of the camera holder of claim 1 having a camera attached to the support structure of the camera holder of claim 1.

14. The combination of claim 13, wherein the camera is a video recorder.

15. A camera holder for retaining a camera, wherein the camera has a lens, the lens having a line of sight, the camera holder being retained against the torso of a user in such a way that the line of sight of the camera lens is substantially horizontal, the camera holder comprising:

(a) a support structure adapted to firmly retain a camera having a first end and a second end and having a length;

(b) a body rest member having a body rest surface, the body rest member being attached to the first end of the support structure;

(c) first and second lateral members extending laterally in opposite directions from the second end of the support structure, each lateral member having a proximal end and a distal end; and (d) a neck strap having opposed neck strap ends, each neck strap end being attached to the distal end of a corresponding lateral member;

wherein the body rest member is a single bar; and wherein the length of the neck strap is between about 25 inches and about 35 inches.

16. The A combination of the camera holder of claim 15 having a camera attached to the support structure of the camera holder of claim 16.

17. The combination of claim 16, wherein the camera is a video recorder.

* * * * *